J. DAWSON.
Apparatus for the Production of Spirits and the Prevention of Frauds upon the Revenue.
No. 134,524.      Patented Jan. 7, 1873.
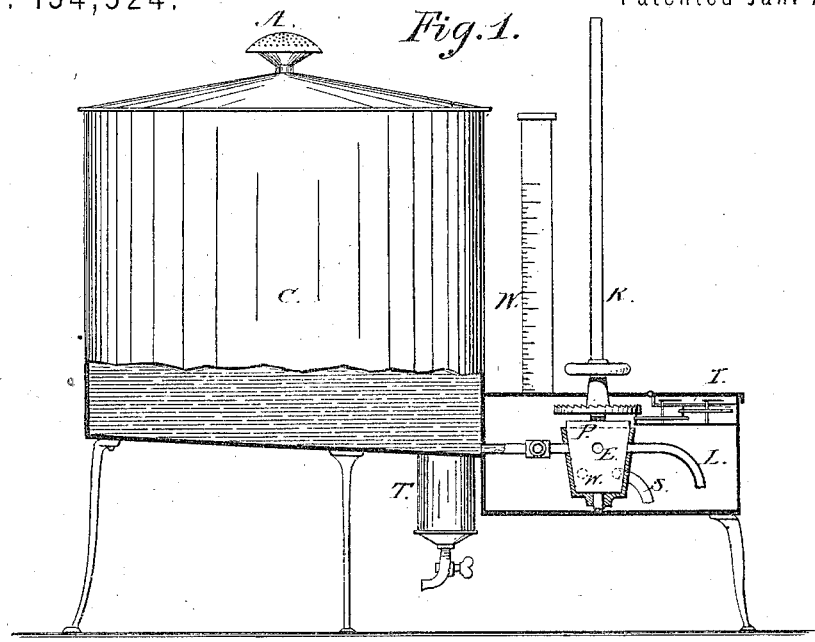
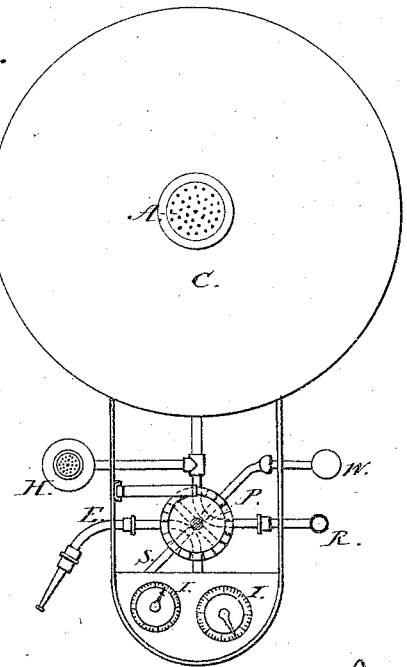
Witnesses.
Edw. W. Donn
Wm H. Blodgett
Inventor.
Joseph Dawson

UNITED STATES PATENT OFFICE.

JOSEPH DAWSON, OF STAUNTON, VIRGINIA.

IMPROVEMENT IN APPARATUS FOR THE PRODUCTION OF SPIRITS AND THE PREVENTION OF FRAUD UPON THE REVENUE.

Specification forming part of Letters Patent No. 134,524, dated January 7, 1873.

*To all whom it may concern:*

Be it known that I, JOSEPH DAWSON, of Staunton, in the county of Augusta and State of Virginia, have invented certain Improvements in Apparatus for Producing Spirits, whereby the quantity, gravity, and temperature are indicated; and the following is a specification thereof:

This invention relates to the combination of a measuring-cistern, six-way cock, glass hydrometer, and thermometer-tube; also a glass scale-tube and sample-retainer; the object of this invention being to show the number of charges and quantity of spirits in wine-gallons produced in a given time, and its temperature and gravity, from which data the quantity in proof-gallons can be accurately obtained, thereby securing the interests of the government against fraud without the necessity of employing local United States storekeepers at each distillery.

In the drawing, Figure 1 is a side elevation. C is the measuring-cistern, constructed of any suitable material. A is a ventilator. P is a plug or key in its seat forming a six-way cock, which plug, on being turned one-quarter toward the right, will alternately fill and empty the measuring-cistern. H is a glass tube, containing a hydrometer and thermometer. W is a glass tube, upon which is marked a scale for the purpose of indicating the number of wine-gallons received in the measuring-cistern at each charge of the still. R is the receiving-pipe, conveying the spirits from the condenser through cock P into the measuring-cistern. L is the low-wine pipe, conveying the low-wines into the low-wine cistern. S is the pipe conveying the sample of each charge from glass tube W to sample-retainer T. I is the index or counters, showing the number of charges of the still and revolution of cock P. E is a pipe conveying the high-wines from measuring-cistern C through cock P to the receiving-cistern room.

Fig. 2 is a plan of the same, corresponding letters referring to corresponding parts.

Having thus described my invention, what I claim as new, and desire to secure by Letters Patent, is—

1. The six-way cock, in connection with which is a pawl-and-ratchet wheel to prevent the plug or key from being reversed, the cock constructed as described in drawing, and for the purposes set forth.

2. The combination, with said cock, of a glass tube containing a hydrometer and thermometer for indicating the gravity and temperature of the spirits.

3. The combination, with said cock, of a glass tube in connection with a scale for the purpose of indicating the number of wine-gallons produced at each charge of the still.

4. The combination, with a six-way cock, of a sample vessel for the purpose of retaining an accurate proportional quantity of each charge, which sample is designed to be tested periodically by an authorized official so as to be a check upon the distiller's reports and insure the correctness of the same.

5. The combination, with a six-way cock, of a measuring-cistern for the purpose of receiving all the spirits produced at each charge of the still and retaining the same until the indications showing the quantity in wine-gallons and the temperature and gravity can be taken.

To the above specification of my invention I have signed my hand this 28th day of May, 1872.

JOSEPH DAWSON.

Witnesses:
JAMES S. GRINNELL,
T. C. SMITH.